(12) United States Patent (10) Patent No.: US 7,319,885 B2
Mukai et al. (45) Date of Patent: Jan. 15, 2008

(54) RADIO COMMUNICATION APPARATUS AND METHOD

(75) Inventors: Manabu Mukai, Yokohama (JP); Takeshi Tomizawa, Kawasaki (JP); Daisuke Takeda, Tokyo (JP); Takashi Wakutsu, Kawasaki (JP); Mutsumu Serizawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 995 days.

(21) Appl. No.: 10/392,866

(22) Filed: Mar. 21, 2003

(65) Prior Publication Data

US 2003/0181218 A1 Sep. 25, 2003

(30) Foreign Application Priority Data

Mar. 22, 2002 (JP) ............................. 2002-081990
Jun. 28, 2002 (JP) ............................. 2002-191407

(51) Int. Cl.
*H04M 1/00* (2006.01)
*H04M 3/00* (2006.01)
*H04Q 7/20* (2006.01)

(52) U.S. Cl. .................... 455/550.1; 455/418; 455/436

(58) Field of Classification Search ................ 455/418, 455/419, 550.1, 334, 432.1, 435.1, 436–439
See application file for complete search history.

(56) References Cited

U.S. PATENT DOCUMENTS

| 6,029,239 | A | 2/2000 | Brown | |
|---|---|---|---|---|
| 2002/0024993 | A1* | 2/2002 | Subramanian et al. | ....... 375/216 |
| 2002/0031166 | A1 | 3/2002 | Subramanian et al. | |
| 2003/0181218 | A1 | 9/2003 | Mukai et al. | |

FOREIGN PATENT DOCUMENTS

| GB | 2 366 957 | 3/2002 |
|---|---|---|
| JP | 4-345245 | 12/1992 |
| JP | 8-293815 | 11/1996 |
| JP | 9-331579 | 12/1997 |
| JP | 2000-32544 | 1/2000 |
| JP | 2001-285181 | 10/2001 |
| JP | 2002-76979 | 3/2002 |
| WO | WO 01/50624 | 7/2001 |

OTHER PUBLICATIONS

U.S. Appl. No. 11/259,047, filed Oct. 27, 2005, Mukai et al.

* cited by examiner

*Primary Examiner*—Harry S. Hong
(74) *Attorney, Agent, or Firm*—Oblon, Spivak, McClelland, Maier & Neustadt, P.C.

(57) ABSTRACT

A radio communication apparatus compatible with a plurality of communication systems and application services comprises a radio transmitting/receiving unit for transmitting and receiving a radio signal, signal processing circuit for executing part of digital signal processing which may be executed when a radio signal is transmitted or received, first processors connected to the signal processing circuit for at least executing communication control related to connection between the radio communication apparatus and the communication systems, and an application program related to the application services, and second processors connected to the signal processing circuit for at least executing another part of the digital signal processing, and control of the signal processing circuit, the amount of processing of the second processors being greater than the amount of processing of the first processors, the processing concerning the executing unit.

20 Claims, 7 Drawing Sheets

RADIO COMMUNICATION APPARATUS AND METHOD

CROSS-REFERENCE TO RELATED APPLICATIONS

This application is based upon and claims the benefit of priority from the prior Japanese Patent Applications No. 2002-081990, filed Mar. 22, 2002; and No. 2002-191407, filed Jun. 28, 2002, the entire contents of both of which are incorporated by reference.

BACKGROUND OF THE INVENTION

1. Field of the Invention

The present invention relates to a radio communication apparatus and method which utilize a so-called software radio technique and are compatible with a plurality of communication systems or applications due to changing programs.

2. Description of the Related Art

Software radio devices have been proposed as one of the means for realizing a multi-mode terminal. In such devices, at least part of the signal processing necessary for signal transmission or reception is executed by software, using a programmable device such as a digital signal processor (DSP). The basic idea of software radio devices is known from, for example, Jpn. Pat. Appln. KOKOAI Publication No. 9-331579. However, how to realize such devices under various conditions has not been sufficiently disclosed.

The unit in a software radio device that deals with a baseband signal, i.e., a modem, processes a large amount of data, and is required to execute high-level processing such as protocol stack, system control processing, and sometimes application data processing. Therefore, the modem is subject to a design change each time the standards for the communication system are changed. The aforementioned programmable device can cope flexibly with such a design change through a change in the software. However, the capability of a programmable device such as a DSP may be insufficient for high-speed processing of broadband radio communication signals.

To make a software radio device handle a new communication system, or to add a new application service function, it is necessary to prepare the necessary free resources. Resources management is also necessary for optimally sharing one resource between communication systems or services.

As a general design concept for radio communication apparatuses, resources are assigned to a plurality of signal processes at a predetermined ratio. If this concept is applied to software radio devices, the rate of use of each resource is significantly reduced since the radio communication apparatuses must deal with a plurality of communication systems or application services.

BRIEF SUMMARY OF THE INVENTION

It is an object of the invention to provide a radio communication apparatus capable of accurately and efficiently performing resources management, and a radio communication method employed in the device.

To achieve the object, according to an aspect of the invention, there is provided a radio communication apparatus compatible with a plurality of communication systems and a plurality of application services, the radio communication apparatus comprising: a transceiver transmitting and receiving a radio signal; an executing unit configured to execute a first part of a digital signal processing which is executed in response to one of transmitting and receiving of the radio signal; a first processor connected to the executing unit, at least, controlling a connection between the radio communication apparatus and one of the communication systems, and the first processor being further capable of processing at least one application program related to the application services; and a second processor connected to the executing unit, executing a second part of the digital signal processing, and controlling the executing unit, wherein an amount of processing by the second processor being greater than an amount of processing by the first processor, the processing concerning the executing unit.

According to another aspect of the invention, there is provided a radio communication apparatus compatible with a plurality of communication systems and a plurality of application services, the radio communication apparatus comprising: a transceiver transmitting and receiving a radio signal; an executing unit configured to execute a first part of a digital signal processing which is executed in response to one of transmitting and receiving of the radio signal; a first processor connected to the executing unit, executing a second part of the digital signal processing, and executing a first part of a communication control processing related to a connection between the radio communication apparatus and one of the communication systems, the first processor being further capable of processing at least one application program related to the application services; a second processor connected to the executing unit, executing a second part of the communication control processing, and controlling the executing unit, wherein an amount of processing by the second processor being greater than an amount of processing by the first processor, the processing concerning the executing unit; and a third processor connected to the executing unit and executing a third part of the digital signal processing, wherein an amount of processing by the third processor being greater than the amount of processing by the second processor, the processing concerning the executing unit.

According to yet another aspect of the invention, there is provided a radio communication method for use in a radio communication apparatus compatible with a plurality of communication systems and a plurality of application services, the radio communication method comprising: executing a first part of a digital signal processing which is executed in response to a radio signal; controlling a connection between the radio communication apparatus and one of the communication systems, and processing at least one application program related to the application services; and executing a second part of the digital signal processing, and controlling the first part of the digital signal processing, wherein an amount of processing when executing the second part and controlling the first part being greater than an amount of processing when controlling the connection and processing at least the one application program, the processing concerning the digital signal processing.

DETAILED DESCRIPTION OF THE INVENTION

Embodiments of the invention will be described with reference to the accompanying drawings.

First Embodiment

Figure 1:
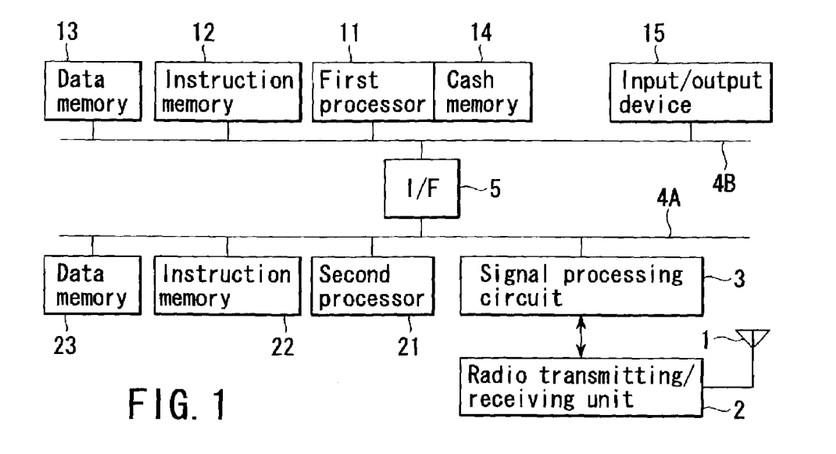
FIG. 1 is a block diagram illustrating a radio communication apparatus according to a first embodiment of the invention.

FIG. 1 shows the configuration of a radio communication apparatus according to a first embodiment of the invention. This radio communication apparatus receives, via an antenna 1, an RF (Radio Frequency) signal transmitted from a base station (not shown), and transmits an RF signal to the base station. The receiving signal from the antenna 1 is converted into a digital receiving IF (Intermediate Frequency) signal by a radio transmitting/receiving unit 2, and supplied to a signal processing circuit 3. The digital transmitting IF signal generated by the signal processing circuit 3 is converted into a transmitting RF signal by the radio transmitting/receiving unit 2, and supplied to the antenna 1.

The signal processing circuit 3 is a programmable hardware circuit, such as a PLD (Programmable Logic Device) or FPGA (Field Programmable Gate Array), and executes part of the digital signal processing that may be executed when the radio transmitting/receiving unit 2 transmits or receives a signal, the part of the digital signal processing being, for example, processing in a region (baseband) close to the signal region of the radio transmitting/receiving unit 2. More specifically, as signal processing in the baseband, the signal processing circuit 3 demodulates the sampled, digitized IF signal output from the radio transmitting/receiving unit 2 to generate a receiving baseband signal, and also modulates transmission data into a transmitting baseband signal. The signal processing circuit 3 is connected to a first bus 4A, which is connected to a second bus 4B via a bus interface 5.

The second bus 4B is connected to a first processor 11, an instruction memory 12 that stores a program executed by the processor 11, a data memory 13 that stores data and is used by the processor 11 as a work memory, and a cache memory 14 used, when necessary, by the processor 11. The first processor 11 is, for example, a CPU (Central Processing Unit). The instruction memory 12 and data memory 13 forms a so-called main memory. The cache memory 14 can be accessed at high speed, and may be formed of one or both of a primary cache contained in the processor 11 and a secondary cache provided outside the processor 11.

The first processor 11 performs communication control related to connection between the radio communication apparatus and a communication system, and also executes application programs. More specifically, as communication control, the first processor 11 executes, for example, protocol program processing of the layer 2 and the layer 3. Further, the processor 11 executes application programs related to application services, such as E-mails, data communication and Web (world wide web) browsing. The first processor 11 may execute part of the signal processing executed when the radio transmitting/receiving unit 2 transmits or receives a signal.

The second bus 4B is further connected to an input/output device 15. The input/output device 15 comprises various input/output units that interface the radio communication apparatus with its user, such as a microphone for inputting a voice, speaker for sounding, and keyboard and display. The keyboard is used to operate dial keys or function keys, to input texts or to execute editing operations, etc. The display displays incoming information, contents related to various application services, and various menus, etc. The input/output device 15 has an MPEG interface for performing video image compression/decompression, and USB interface for performing serial input/output between the terminal device and an external device. The input/output device 15 may further comprise a connector to be connected to an external device via a wired line. The mentioned elements of the input/output device 15 are connected by the bus 4B.

On the other hand, the first bus 4A is connected to a second processor 21, an instruction memory 22 that stores a program executed by the processor 21, and a data memory 23 that stores data and is used by the processor 21 as a work memory. The second processor 21 is, for example, a CPU or DSP (Digital Signal Processor), and executes part of the digital signal processing that may be executed when the radio transmitting/receiving unit 2 transmits or receives a signal. Specifically, the processor 21 executes processing of data signals outside the baseband, such as "correlation operations", "complex value arithmetic", "maximum value detection", "address transformation", "sequencer", "high-speed input/output processing", "accumulation", "accelerated function operations", etc. The second processor 21 also controls the signal processing circuit 3.

In the embodiment, the required frequency of signal exchange with the signal processing circuit 3, and the required response speed of signal exchange with the signal processing circuit 3 differ between the processors.

In the embodiment, the first processor 11 is connected to the signal processing circuit 3 via the bus interface 5 and bus 4B, while the second processor 21 is connected to the signal processing circuit 3 via the bus 4A only. Since the first processor 11 is thus connected to the circuit 3 via a larger number of buses than the second processor 21, the response speed of signal exchange between the first processor 11 and circuit 3 is reduced compared to that between the second processor 21 and circuit 3. Accordingly, the required frequency of signal exchange is reduced between the processor 11 and circuit 3. Between circuits connected via a larger number of buses, if the frequency of signal exchange is high, the power consumption due to signal exchange is increased.

In other words, compared to the second processor 21, the processing amount of the first processor 11 with respect to the signal processing circuit 3 is small. In this case, compared to the second processor 21, the required frequency and response speed of signal exchange between the first processor 11 and circuit 3 are low.

In general, the software employed in radio communication apparatuses is influenced by the time slot or time frame used in the communication system. The lower layer the software, the stronger the temporal constraint. Therefore, if software pieces of different layers are used in a single processor (CPU or DSP), processing of a stronger temporal constraint competes with processing that requires a high operational capability. As a result, a problem will occur in which a processor that executes processing of a strong temporal constraint consumes many operational resources. "Resources" mean a processor (CPU, DSP, etc.), memory, the processing capability of each processor, and the function blocks of an FPGA, ASIC, etc.

In the radio communication apparatus of the embodiment, software pieces of different layers are used in different processors, i.e., the first and second processors 11 and 21. In this structure, the degree of relation between the operation resources of the processors 11 and 21 is reduced to enhance the efficiency of use of resources. Specifically, as described above, the first processor 11 mainly executes higher layer processing such as the execution of communication control or application programs. The second processor 21 executes lower layer processing such as data signal processing, which is not executed by the signal processing circuit 3, and the control of the signal processing circuit 3. As a result, the processing efficiency of the processors 11 and 21 as operation resources is enhanced.

Further, in the embodiment, the cache memory 14 is provided for the first processor 11, which further enhances the processing capability of the processor 11 that executes programs of a weak temporal constraint (such as a communication control program, application programs, etc.), without wasting operation resources for the processor 11.

Second Embodiment

Figure 2:
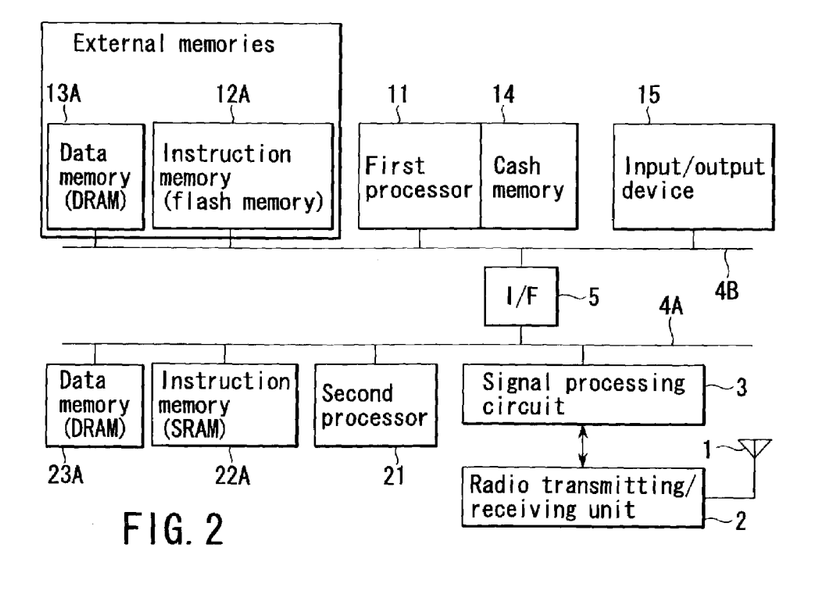
FIG. 2 is a block diagram illustrating a radio communication apparatus according to a second embodiment of the invention.

FIG. 2 shows the configuration of a radio communication apparatus according to a second embodiment of the invention as a modification of the first embodiment. In FIG. 2, elements similar to those of FIG. 1 are denoted by corresponding reference numerals. In the second embodiment, an instruction memory 12A and data memory 13A, which form a main memory for the first processor 11, are constructed as external memories detachable from the radio communication apparatus. The size of the LSI employed in the radio communication apparatus can be reduced to reduce the size of the entire device and the power consumption of the device, by using external memories to form the main memory of the first processor 11.

Specifically, the instruction memory 12A as an external memory is formed of, for example, a flash memory (electrically rewritable nonvolatile memory). The data memory 13A as an external memory is formed of, for example, a DRAM (Dynamic Access Memory). On the other hand, an instruction memory 22A and data memory 23A, which provide the main memory of the second processor 21, are formed of, for example, an SRAM (Static Random Access Memory) and DRAM, respectively.

In the embodiment constructed as above, the main memory (instruction memory 12A and data memory 13A) of the first processor 11 is formed of external memories, which enables, without increasing the size of the LSI chip in the radio communication apparatus, the first processor 11 to easily execute application software that requires a large instruction memory area and data memory area.

Further, since in the embodiment, different types of memories are used, the following advantage can be obtained. A DRAM requires a refresh operation to maintain the data stored therein, but requires only a small area. An SRAM is disadvantageous in area, but does not require a refresh operation. A flash memory can store a large amount of information without power supply.

In general, radio communication apparatuses are used in standby mode in which signals are received with the supply of power periodically stopped to save power. In this state, if all the memories in the radio communication apparatus are formed of a DRAM, it is necessary to download a communication program and/or application program into the device when power is again supplied, which results in time and power loss.

On the other hand, when no signal is received in the standby mode, the data memories 13A and 23A as data areas do not have to hold data. Upon re-supply of power, the program is again operated to write data into them. Therefore, the above-described structure enables the LSI chip size to be reduced and also enables communication to be continued without program loss due to a standby mode operation.

Third Embodiment

Figure 3:
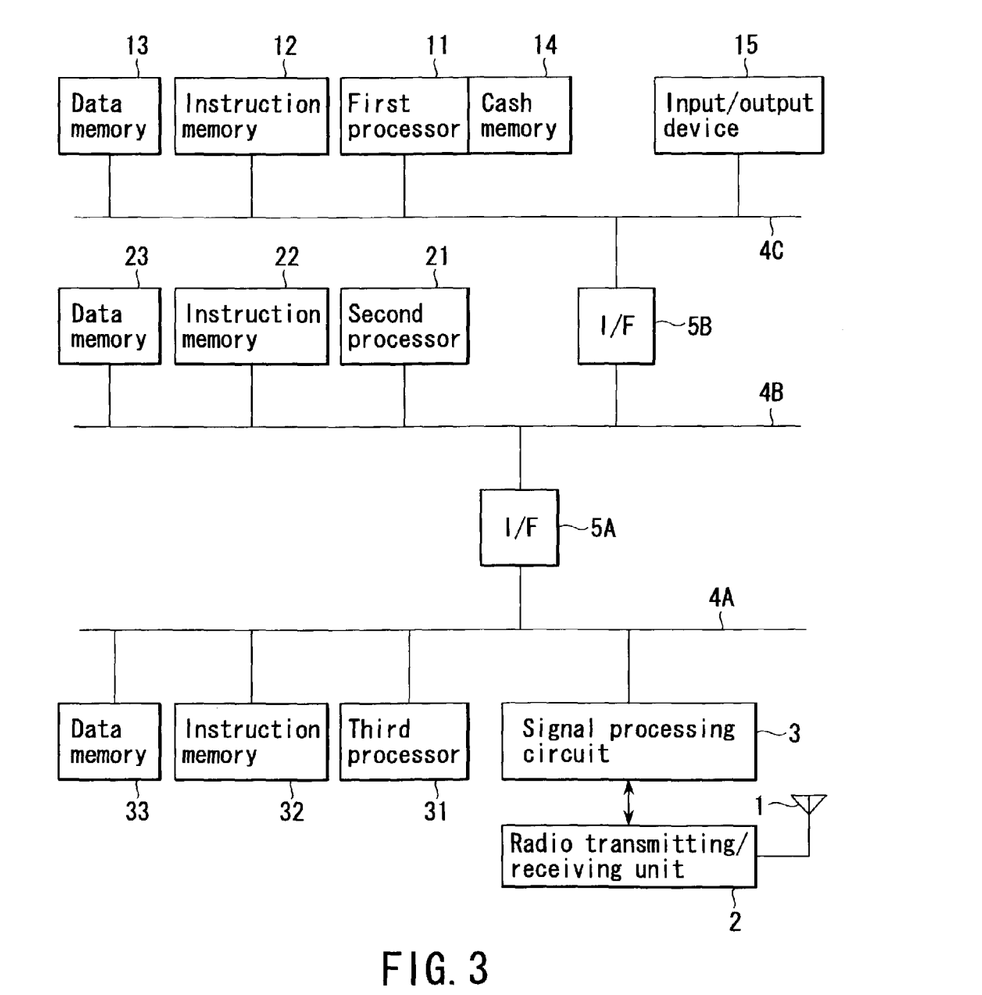
FIG. 3 is a block diagram illustrating a radio communication apparatus according to a third embodiment of the invention.

FIG. 3 shows the configuration of a radio communication apparatus according to a third embodiment of the invention. The third embodiment employs first, second and third processors 11, 21 and 31. Further, there are provided an instruction memory 12, data memory 13 and cache memory 14, which form a main memory for the first processor 11, an instruction memory 22 and data memory 23, which form a main memory for the second processor 21, and an instruction memory 32 and data memory 33, which form a main memory for the third processor 31. The instruction memory 22 and data memory 23 for the second processor 21 may be formed of external memories, as in the second embodiment.

The third processor 31 formed of, for example, a CPU or DSP, and instruction memory 32 and data memory 33 belonging to the processor 31 are connected to the bus 4A, to which the signal processing circuit 3 is connected. The second processor 21 formed of, for example, a CPU, and instruction memory 22 and data memory 23 belonging to the processor 21 are connected to the bus 4B, which is connected to the bus 4A via an interface 5A. Similarly, the first processor 11 formed of, for example, a CPU, instruction memory 12, data memory 13 and cache memory 14 belonging to the processor 11, and input/output device 15 are connected to a bus 4C, which is connected to the bus 4B via an interface 5B.

The input/output device 15 comprises various input/output units that interface the radio communication apparatus with its user, such as a microphone for inputting a voice, speaker for sounding, and keyboard and display, an MPEG interface for performing video image compression/decompression, USB interface for performing serial input/output between the terminal device and an external device, and a connector to be connected to an external device via a wired line.

In the embodiment, the required frequency of signal exchange with the signal processing circuit 3, and the required response speed of signal exchange with the signal processing circuit 3 differ between the processors.

In this embodiment, the first processor 11 is connected to the signal processing circuit 3 via the bus 4C, bus interface 5B, bus 4B, bus interface 5A and bus 4A. The second processor 21 is connected to the signal processing circuit 3 via the bus 4B, bus interface 5A and bus 4A. The third processor 31 is connected to the signal processing circuit 3 via the bus 4A only. Thus, the first processor 11 is connected to the signal processing circuit 3 via a larger number of buses than the second processor 21. Similarly, the second processor 21 is connected to the signal processing circuit 3 via a larger number of buses than the third processor 31. Therefore, compared to the second processor 21, the response speed of signal exchange between the first processor 11 and circuit 3 is reduced, and the required frequency of signal exchange between the first processor 11 and circuit 3 is reduced. Similarly, compared to the third processor 31, the response speed of signal exchange between the second processor 21 and circuit 3 is reduced, and the required frequency of signal exchange between the second processor 21 and circuit 3 is reduced.

In other words, compared to the second processor 21, the processing amount of the first processor 11 with respect to the signal processing circuit 3 is small. In this case, compared to the second processor 21, the required frequency and response speed of signal exchange between the first processor 11 and circuit 3 are low. Similarly, compared to the third processor 31, the processing amount of the second processor 21 with respect to the signal processing circuit 3 is small. In this case, compared to the third processor 31, the required frequency and response speed of signal exchange between the second processor 21 and circuit 3 are low.

The first processor 11 at least executes application programs, and executes, when necessary, communication control related to the connection between the radio communication apparatus and communication system. The second processor 21 at least controls the signal processing circuit 3. The third processor 31 at least executes digital signal processing when the radio transmitting/receiving unit 2 transmits or receives a signal.

Figure 4:
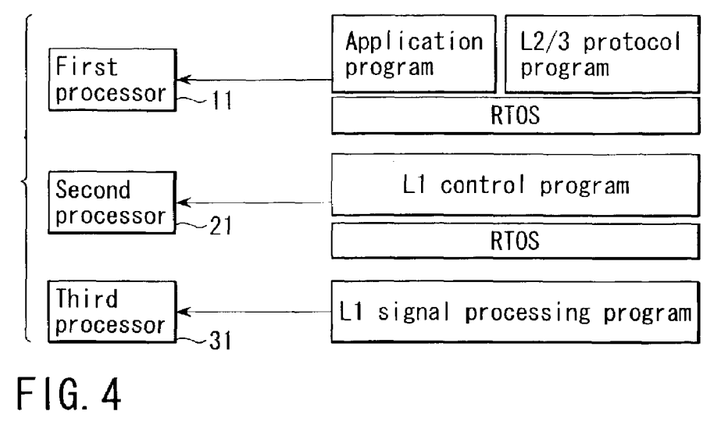
FIG. 4 is a view useful in explaining examples of processes executed by the first, second and third processors appearing in FIG. 3.

FIG. 4 is a view useful in explaining examples of processes executed by the first, second and third processors 11, 21 and 31. The first processor 11 executes application programs and L2/3 protocol programs using the RTOS (Real-time Operating System). As stated in the first embodiment, the application programs are related to application services such as E-mails, data communication and Web browsing, and are unrelated to a call service. The first processor 11 may execute part of the signal processing executed when the radio transmitting/receiving unit 2 transmits or receives a signal. The second processor 21 executes, using the RTOS or the scheduler instead of the RTOS, the L1 control program for controlling the signal processing circuit 3. The third processor 31 executes, by executing the L1 signal processing program without using the signal processing circuit 3, processing of data signals outside the baseband, such as "correlation operations", "complex value arithmetic", "maximum value detection", "address transformation", "sequencer", "high-speed input/output processing", "accumulation", "accelerated function operations", etc. This digital signal processing is included in the processing executed when the radio transmitting/receiving unit 2 transmits or receives a signal.

Figure 5:
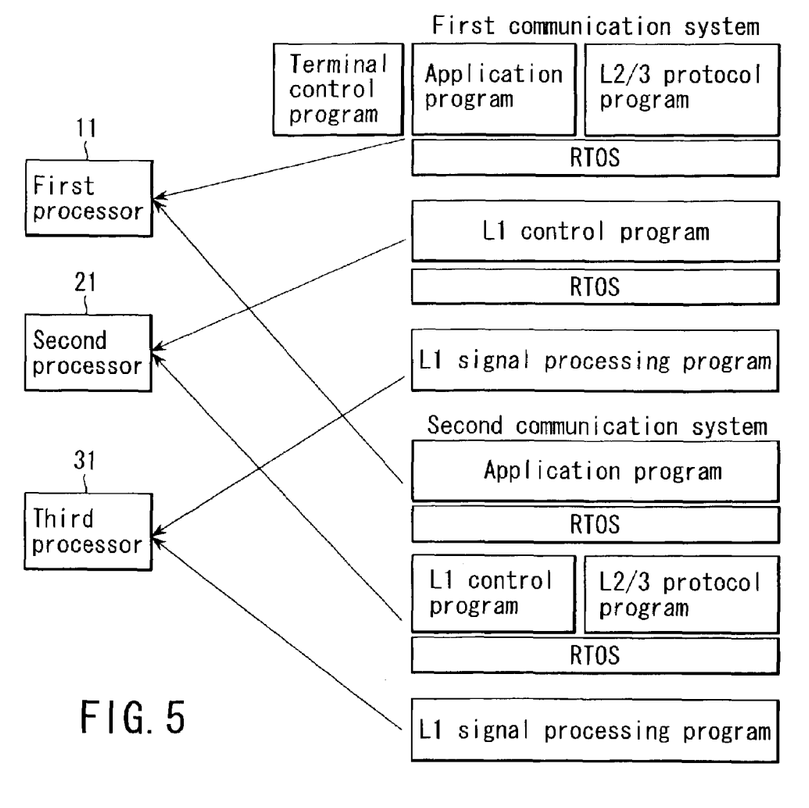
FIG. 5 is a view useful in explaining examples of processes executed by the first, second and third processors in FIG. 3 when the processors employ each of first and second communication systems.

In the examples of FIG. 4, the processes executed by the first, second and third processors 11, 21 and 31 are fixed. However, the first, second and third processors 11, 21 and 31 may be designed to execute different processes in accordance with the communication system connected thereto. FIG. 5 shows examples of processes executed by the first, second and third processors 11, 21 and 31 when the processors are connected to each of first and second communication systems that require different processing capacities. The first communication system is a communication system that requires a large processing capacity, such as the third generation mobile communication system (for example, W-CDMA (Wideband Code Division Multiple Access)). The second communication system is a communication system that requires a small processing capacity, such as the second generation mobile communication system (for example, a PDC (Personal Digital Cellular) system or GSM (Global System for Mobile communication)).

In the configuration as employed in the first or second embodiment, in which only two processors, i.e., the first and second processors 11 and 21, are provided, the first processor 11 may be made to execute the application programs and L1 control program (see FIG. 4), the second processor 21 may be made to execute the L1 signal processing program (see FIG. 4), and the L2/3 protocol programs may be appropriately distributed to the first and second processors 11 and 21 in accordance with the communication system connected to the radio communication apparatus.

In the case of FIG. 5, if the radio communication apparatus is connected to the first communication system, the first processor 11 executes the application programs and L2/3 protocol programs that are operable under the RTOS, the second processor 21 executes the L1 control program operable under the RTOS, and the third processor 31 executes the L1 signal processing program, as in the case of FIG. 4. On the other hand, if the radio communication apparatus is connected to the second communication system, the first processor 11 executes only the application programs under the RTOS, the second processor 21 executes the L1 control program and L2/3 protocol programs under the RTOS, and the third processor 31 executes the L1 signal processing program. Further, the first processor 11 can perform handover processing between communication systems and paging signal reception processing, described later, by executing, under the RTOS, a terminal control program related to communication control.

As described above, if the radio communication apparatus is connected to the first communication system that requires a large processing capacity, the first processor 11 connected to the signal processing circuit 3 via the largest number of buses is made to execute communication control and application programs, the second processor 21 connected to the signal processing circuit 3 via the second largest number of buses is made to control the signal processing circuit 3, and the third processor 31 connected to the signal processing circuit 3 via the smallest number of buses is made to execute digital signal processing without using the signal processing circuit 3, the digital signal processing being included in the processing executed during signal transmission or reception.

Further, if the radio communication apparatus is connected to the second communication system that requires a small processing capacity, the first processor 11 is made to execute only the application programs, the second processor 21 is made to execute communication control as well as the control of the signal processing circuit 3, and the third processor 31 is made to execute digital signal processing without using the signal processing circuit 3. This digital signal processing is included in the processing executed during signal transmission or reception. If the amount of the entire processing is relatively small as described above, all the resources of the first processor 11 can be assigned to the processing of the application programs, which can realize optimal resource assignment.

[Handover Processing Between Communication Systems]

Figure 6:
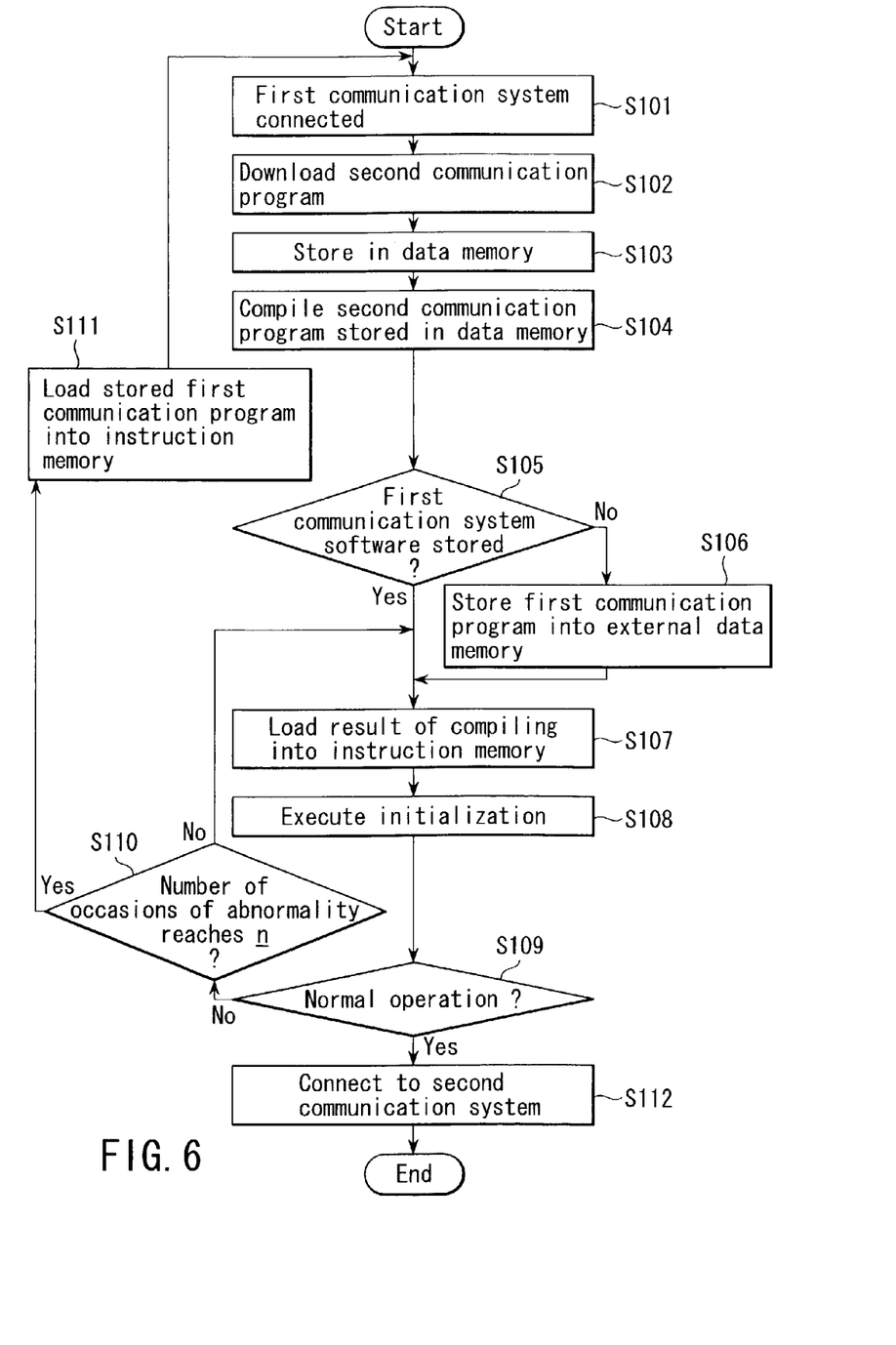
FIG. 6 is a flowchart illustrating the procedure of handover processing between communication systems, according to the third embodiment.

FIG. 6 shows a procedure, included in the radio communication apparatus and method of the embodiment, for shifting the communication system to be connected. Specifically, FIG. 6 shows the procedure of shifting the communication system from the first one to the second one. This operation can be performed with communication maintained (handover processing between communication systems), or by exchanging a communication program for another when a user buys a radio communication apparatus at a shop.

Firstly, assume that a user of the radio communication apparatus has issued a request for switching the communication system from the first communication system to the second communication system, when the radio communication apparatus is connected to the first communication system (S101), or when a communication program for the first communication system is loaded in the first processor 11. In this case, the first processor 11 downloads a communication program (second communication program) for the second communication system (S102), and stores the second communication program in the data memory 13, which is preferably an external memory (S103).

The second communication program can be downloaded by radio via the antenna 1 and radio transmitting/receiving unit 2, or by a wired line connected to the connector provided for the input/output device 15. At this time, it is desirable for preventing extra download that the first processor 11 should determine whether the entire or only part of the second communication program is necessary for communication based on the second communication system, to thereby download only a necessary part of the program on the basis of the determination result.

Subsequently, the first processor 11 compiles the second communication program, stored in the data memory 13, into a language suitable for the structure of the radio communication apparatus (S104).

After that, the first processor 11 determines whether or not various types of software pieces necessary for communication based on the first communication system are stored for the purpose of system backup (S105). If they are not stored, the first communication program and data are stored in the instruction memory 12 and data memory 13, respectively, which are preferably external memories, thus backing up the first communication system software (S106).

Thereafter, the compiled second communication program is loaded, when necessary, into the instruction memories 12, 22 and 32 (S107), and initialization for operating the radio communication apparatus in accordance with the second communication program is executed on a necessary portion after the loading finishes (S108).

After that, it is checked whether or not the radio communication apparatus can normally operate (S109). If an abnormality occurs, the program returns to the step S107 where the compiling result of the second communication program is again loaded into the instruction memories 12, 22 and 32. In another case, if there is an abnormality, the program may returns not to the step S107 but to the step S104, where compile processing may be executed for the second communication program.

When the radio communication apparatus is abnormal, if the abnormality is not eliminated even after the operation of loading the compiling result concerning the second communication program into the instruction memories 12, 22 and 32 is executed several times (n times), or after the operation of compiling the second communication program is executed several times (n times) (YES at a step S110), the first system program backed up at the step S106 is again loaded (step S111). Thereafter, the program returns to the step S101 where the radio communication apparatus is again connected to the first communication system.

On the other hand, if it is determined, as a result of the internal checking at the step S109, that the radio communication apparatus is normally operating and there is no particular problem, the radio communication apparatus is connected to the second communication system (step S112).

By virtue of the above-described procedure, the radio communication apparatus can realize handover between the communication systems simply by switching the communication programs. In other words, the radio communication apparatus does not need a plurality of modems. The above-described handover procedure between the communication systems is executed by the first processor 11 in accordance with the terminal control program shown in FIG. 5.

Although in the above description, the communication program are downloaded through a radio or wired line, they may be directly written to the first, second and third processors 11, 21 and 31.

[Reception of Paging Signal]

Figure 7:
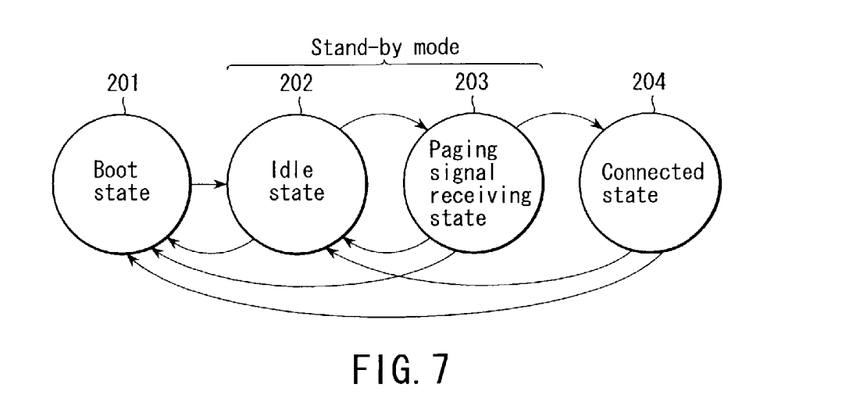
FIG. 7 is a view illustrating state transition related to the paging signal receiving process of the radio communication apparatus of FIG. 3.
Figure 8:
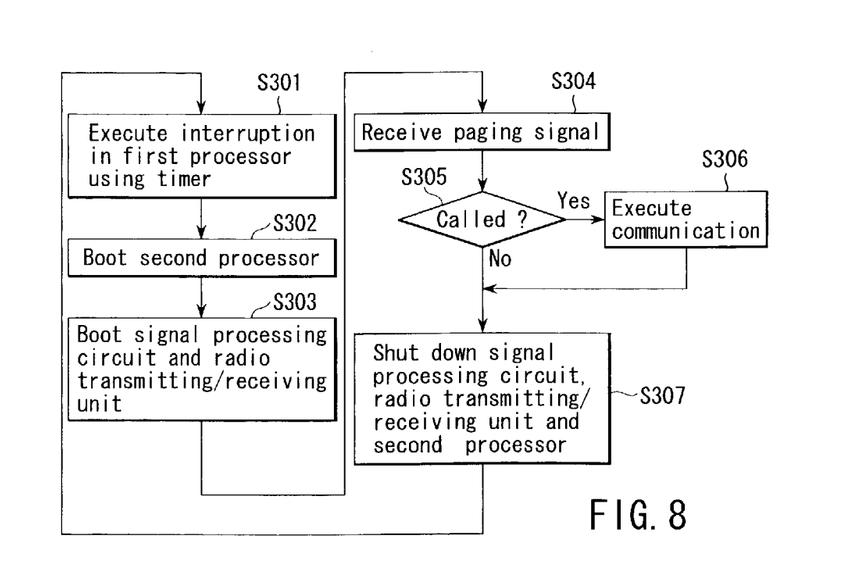
FIG. 8 is a flowchart illustrating the procedure of the paging signal receiving process of the radio communication apparatus of FIG. 3.

The operation of receiving a paging signal by the radio communication apparatus of the embodiment will now be described. FIG. 7 is a view illustrating state transition related to the paging signal, and FIG. 8 illustrates the procedure of the paging signal receiving process.

As illustrated in FIG. 7, if the radio communication apparatus does not assume a connected state 204 for a predetermined time period after it is turned on and assumes a boot state 201, it enters a paging signal receiving mode in which it waits for a call from the communication system side. In the paging signal receiving mode, the radio communication apparatus repeats, in units of several seconds, an idle state 202 in which the device does not receive a paging signal from the communication system side but assumes a waiting state for the reception of the next paging signal, and a paging signal receiving state 203 in which a paging signal is received. To save power in the paging signal receiving mode, in the idle state 202, power consumption is suppressed by stopping the supply of unnecessary power or clock, and in the paging receiving state 203, a paging signal is received.

If the radio communication apparatus is turned off when it is in the idle state 202, paging signal receiving state 203 or connected state 204, it assumes the boot state 201 as the initial state. In this state, if power is supplied, the idle state 202 is assumed. Specifically, this paging signal receiving operation is performed as shown in FIG. 8.

(1) Idle State: the time at which the idle state finishes is determined by supplying an interruption signal to the first processor 11, using a timer or clock counter (neither of which is shown) operating under the control of the processor 11 (step S301).

(2) Preparation for Receiving a Paging Signal: the first processor 11 starts to receive a paging signal in response to a signal from the timer, thereby booting the second processor 21 (step S302). At this time, the second processor 21 executes a predetermined boot sequence.

(3) Booting of Signal Processing Circuit and Radio transmitting/Receiving unit: the second processor 21 controls the supply of power and clock to the signal processing circuit 3 and/or radio transmitting/receiving unit 2, to execute necessary initialization (step S303).

(4) Paging Signal Receiving State: a paging signal from the communication system side is received during a paging signal receiving period of time (step S304).

(5) Idle-State Shutdown: the radio communication apparatus determines whether or not it is called by a paging signal (step S305). If the device is not called, the second processor 21 executes setting of an unnecessary one or more of the second processor 21, signal processing circuit 3 and radio transmitting/receiving unit 2, which are in the idle state, and stops the supply of one or both of the power and clock to shut them down (step S307). Upon confirming that the state of the second processor 21 has changed, the first processor 11 assumes an idle state.

(6) Preparation for Communication: if the radio communication apparatus determines at the steps S304 and S305 upon the reception of a paging signal that the device is being called, the second processor 21 executes the booting and setting of the radio transmitting/receiving unit 2 necessary for communication, to make the device assume a connected state (step S306). After communication is finished, the second processor 21 shuts down an unnecessary one or more of the processor 21, signal processing circuit 3 and radio transmitting/receiving unit 2, which are in the idle state. Thereafter, the first processor 11 confirms that the state of the second processor 21 has changed, and assumes an idle state.

By virtue of the above-described processing, the power consumption of the radio communication apparatus can be reduced and hence the duration of communication can be lengthened. The above-described procedure of receiving a paging signal is executed by the first processor 11 in accordance with the terminal control program shown in FIG. 5. The procedure employed in the third embodiment and described with reference to FIGS. 6-8 is also applicable to the first and second embodiments.

Fourth Embodiment

Figure 9:
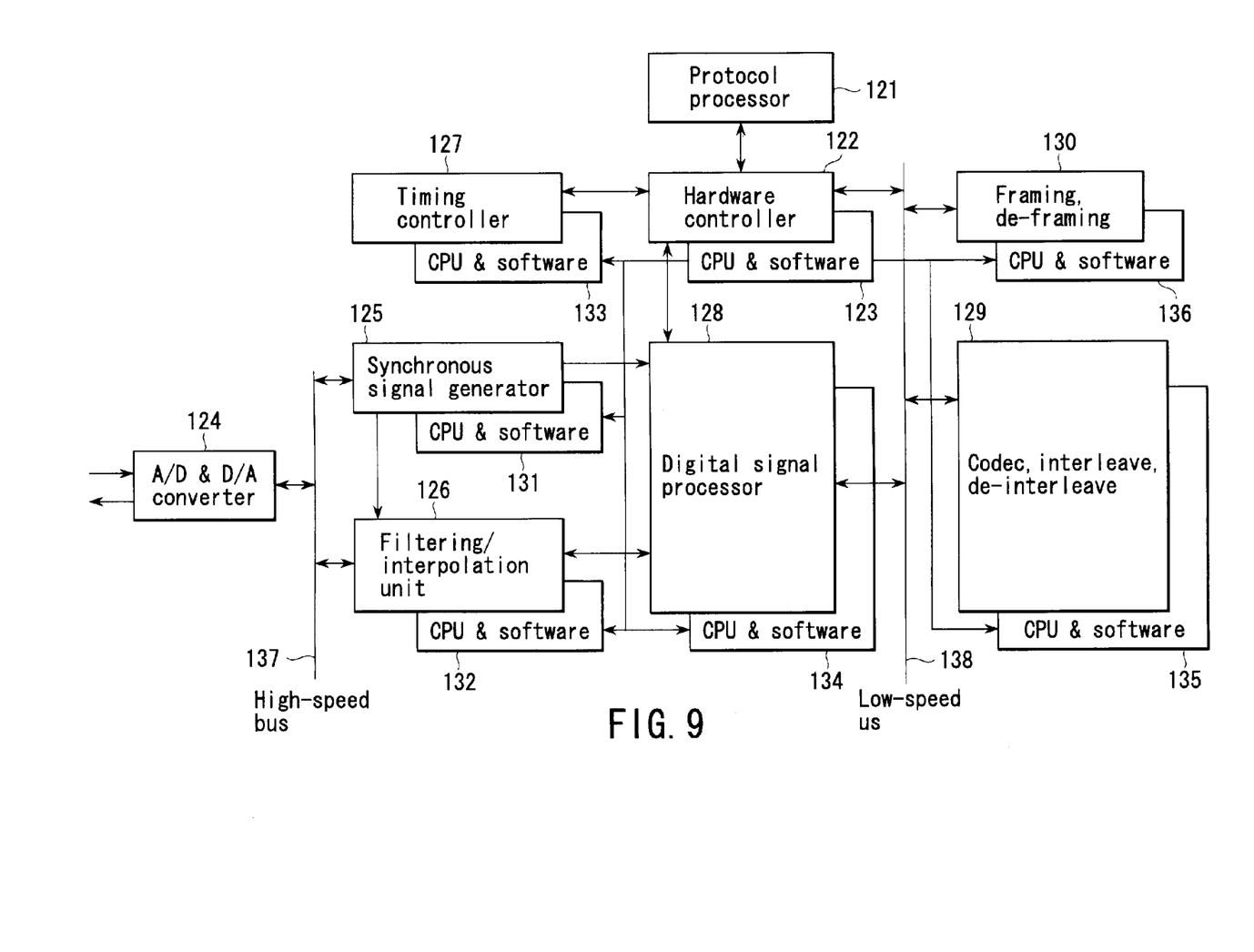
FIG. 9 is a block diagram illustrating the configuration of a signal processing device incorporated in a radio communication apparatus according to a fourth embodiment.

Referring to FIG. 9, a signal processing device incorporated in a radio communication apparatus according to a fourth embodiment will be described. FIG. 9 is a block diagram illustrating the configuration of the resources and resource manager employed in the radio communication apparatus.

[Configuration of Signal Processing Device]

The radio communication apparatus of the fourth embodiment comprises resources and a resource manager. As shown in FIG. 9, the resource manager is formed of a protocol processor 121 for communication protocol control, hardware controller (total processor) 122 for total control, and versatile processor (CPU) 123 belonging to the hardware controller 122 for total management of the radio communication apparatus.

The resources comprise an A/D and D/A converter 124 for converting a received radio signal into a digital signal and sampling it, and converting a transmission signal into an analog signal; synchronous signal generator 125 for generating a synchronous signal; filtering/interpolation unit 126 for filtering the input digital signal and executing interpolation processing; timing controller 127 for executing timing control of signal processing; digital signal processor 128; channel codec unit 129; framing/de-framing unit 130; and versatile processors 131, 132, 133, 134, 135 and 136 as signal processing units that belong to the synchronous signal generator 125, filtering/interpolation unit 126, timing controller 127, digital signal processor 128, channel codec unit 129 and framing/de-framing unit 130, respectively. The A/D and D/A converter 124, synchronous signal generator 125 and filtering/interpolation unit 126 are connected to a high-speed bus 137 for mainly transmitting a received, sampled signal and a to-be-sampled signal for transmission. The hardware controller 122, digital signal processor 128, channel codec unit 129 and framing/de-framing unit 130 are connected to a low-speed bus 138 for transmitting a relatively slow signal in units of information symbols. The versatile processor (CPU) 123 for total control is connected to the versatile processors 131-136 to supply a control signal thereto.

In the signal processing device constructed as above, the hardware controller 122, A/D and D/A converter 124, synchronous signal generator 125, filtering/interpolation unit 126, timing controller 127, digital signal processor 128, channel codec unit 129 and framing/de-framing unit 130 provide function blocks (function processing units). A greater part of the processors belonging to the function blocks are CPUs of a small processing capacity and execute switching processing necessary when the function blocks perform switching processing in accordance with switching of communication systems. On the other hand, the processor belonging to the hardware controller 122 is a CPU of a rather high processing capability. The CPUs of a low processing capability is of the same type and simple in structure, and are controlled by the CPU 123 belonging to the hardware controller 122, using a signal language (instruction language).

There are provided two information transmission paths, i.e., a control signal transmission path between the CPUs, and an information signal transmission path. The protocol processor 121 and the CPU 123 of the hardware controller 122 are mounted with OSs. The low-capability CPUs are completely controlled by the hardware controller 122 and operate in accordance with a machine language or assembler.

[Operation of Signal Processing Device]

Figure 10:
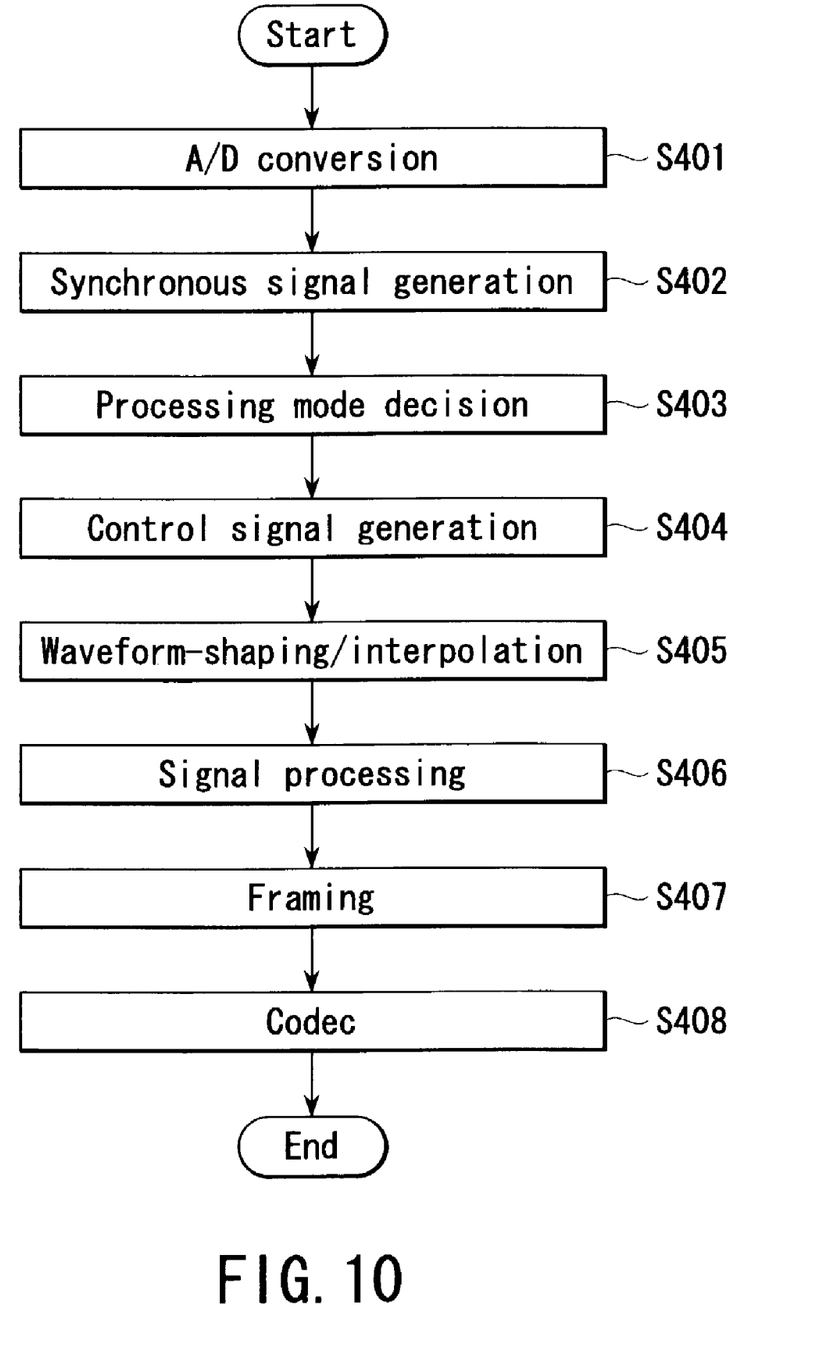
FIG. 10 is a flowchart illustrating the procedure of processing executed by the signal processing device shown in FIG. 9.

The operation of the signal processing device will be described referring to FIG. 10.

A received signal is converted into a digital signal by the A/D and D/A converter 124 (step S401), and supplied to the synchronous signal generator 125 and filtering/interpolation unit 126. The synchronous signal generator 125 extracts, from the received digital signal, a predetermined transmission speed, transmission method and synchronization data, establishes synchronization and starts a timer on the basis of the extracted data, and generates a synchronous signal (S402). Further, in accordance with the media access control (MAC) and access method of the received signal, appropriate synchronization control and timer control are performed. At this time, the timing controller 127 activates a timer on the basis of the synchronous signal, and supplies appropriate timing information and clock to each block.

The protocol processor 121 executes the next action, for example, decides a processing mode (S403) on the basis of the received control signal and an instruction from an upper layer, and instructs the hardware controller 122 to set the mode. If, for example, there is an instruction to receive a TV signal from an upper layer, corresponding to a user's operation, the signal processing device is set to a TV signal receiving mode. At this time, the hardware controller 122 generates a control signal to each block on the basis of the state of synchronization, timer value and output of the protocol processor 121 (S404). The control signal designates when and to which block the signal fetched by the hardware controller 122 is to be output, and also designates what type of processing the designated block should perform. In accordance with the instructions from the hardware controller 122, the filtering/interpolation unit 126 executes waveform-shaping and interpolation on the received signal (S405). The filtering/interpolation unit 126 has a function for detecting a phase lag as a result of interpolation and feeding it back.

In accordance with an instruction from the hardware controller 122, the digital signal processor 128 performs FFT (Fast Fourier Transform), despreading, quantization, etc. on the output of the filtering/interpolation unit 126 (S406), thereby computing an appropriate signal from the input signal and outputting it. The output signal of the digital signal processor 128 is supplied to the framing/de-framing unit 130 and channel codec unit 129. The framing/de-framing unit 130 divides the frame of the received signal into signal components for different layers, and outputs them individually or simultaneously to the bus 138 or a register (not shown) (S407). The channel codec unit 129 executes error control collectively (S408).

As described above, a received signal is subjected to waveform shaping and interpolation. The individual processes, such as digital signal processing on the output of the filtering/interpolation unit 126, and the order of the processes are designated by the hardware controller 122 as a total processing unit.

In the above-described configuration, each function block and processor (CPU) are formed of, for example, the digital signal processor 128 and processor 134 belonging thereto comprise an I/O (Input/Output) interface, main CPU (function block) and auxiliary CPU (processor) and memory. In this configuration, if, for example, the digital signal processor 128 processes a received signal, a received, sampled signal is input to the I/O interface. If, as in a conventional configuration, only the main CPU processes a received broadband radio signal, it uses a large part of its computing capacity for input/output processing, and hence can distribute only the remaining capacity to other processes. On the other hand, in the present embodiment, not the main CPU but the auxiliary CPU executes input/output processing. Accordingly, the processing capability of the main CPU can be distributed to other processes. Thus, the auxiliary CPU is loaded with input/output processing of, for example, data and signal processing, therefore the load of the main CPU is reduced. Thus, the load of processing is decentralized, which enables the entire system to perform high-speed radio signal processing.

The above-described processing is performed when a TV signal is received. On the other hand, when a radio LAN is set, the protocol processor 121 sets a program for the radio LAN in the hardware controller 122. In accordance with the set program, the hardware controller 122 supplies a control signal only to a function block necessary for the radio LAN, and stops the operations of the unnecessary function blocks. Under the control of the hardware controller 122, the digital signal processor 128 generates a transmission signal on the basis of the information input from the input/output device 15, and supplies it to the radio transmitting/receiving unit 2 via the filtering/interpolation unit 126 and converter 124. The signal is transmitted from the unit 2. During the transmission, the time point of transmission of each bit of the signal is determined, and the signal is transmitted in units of bits at the determined time points. Further, a received signal is input, via the filtering/interpolation unit 126, to the digital signal processor 128, where it is subjected to digital processing. After that, the resultant signal is supplied to the input/output device 15 via the bus 138 and displayed thereon.

When a mobile phone mode is set, the protocol processor 121 sets a program for the mobile phone mode in the hardware controller 122. In accordance with the set program, the hardware controller 122 supplies a control signal only to a function block necessary for the mobile phone mode, and stops the operations of the unnecessary function blocks. Under the control of the hardware controller 122, the digital signal processor 128 generates a voice signal on the basis of the voice information input from a microphone incorporated in the input/output device 15, and supplies it to the radio transmitting/receiving unit 2 via the filtering/interpolation unit 126 and converter 124. The signal is transmitted from the unit 2. Further, a received signal is input, via the filtering/interpolation unit 126, to the digital signal processor 128, where it is subjected to digital processing. After that, the resultant signal is supplied to the input/output device 15 via the bus 138, and output from a speaker incorporated in the device 15.

As described above, in the present invention, an auxiliary processor is provided for each function block, the processor that processes part of the processing processed in each function block. As a result, the load on each function block is reduced. The thus-constructed signal processing device employs function blocks for signal processing and signal processing units (i.e. versatile processor) dedicated to signal processing, which are considered to be resources for signal processing. At least one versatile processor is made to execute resource management to load each resource with predetermined signal processing, necessary for realizing a modem, in accordance with signal processing contents. Further, each versatile processor is made to execute the processing, designated by the resource management, in accordance with a program, while each function block is made to execute the processing designated by the resource management of the at least one versatile processor.

Each function block is formed of an arithmetic circuit dedicated to signal processing, a processor for executing a predetermined arithmetic operation in accordance with a program, or a combination of an arithmetic circuit and processor. In other words, each function block is formed of an operation-specified processor, and hence can perform an arithmetic operation at a much higher speed than versatile processors.

Therefore, if resource management is performed, for example, so that the function blocks execute high-load, high-speed processing, and the versatile processors execute low-load processing, the processing speed of the entire apparatus is enhanced. Thus, the present invention enables the transmitting/receiving function to be designed with a high degree of freedom, and at the same time, enables complicated and high-speed signal processing.

Further, since signal processing executed in the radio communication apparatus of the invention is programmable, it is very useful if the invention is applied to a software radio communication apparatus (radio terminal capable of reconstructing a program for transmitting and/or receiving a radio signal) that can execute signal processing suitable for different radio systems employing different radio communication methods.

The radio communication apparatus of the embodiments of the invention can realize a multi-mode by selectively operating the function blocks between different modes such as the TV receiving mode, mobile phone mode, radio LAN mode, etc. In this case, the function block corresponding to the program fetched by the protocol processor is operated by the hardware controller in accordance with the selected mode.

Furthermore, the present invention provides a signal processing device for use in a radio terminal that can easily reconstruct the terminal structure. The signal processing device of the embodiments of the invention enables realization of a radio terminal that is easily adaptable to changes in function or specification and can easily perform handover processing between different radio systems.

In the above-described radio communication apparatuses to be installed in a reconstructable radio terminal, the transmitting/receiving function can be designed with a high degree of freedom, and at the same time, complicated and high-speed signal processing can be realized. These advantages, however, can also be obtained by configurations other than those employed in the embodiments.

As described above, in the radio communication apparatus and method, according to each embodiment of the invention, which are compatible with a plurality of communication systems and application services, a plurality of processors are employed, to which respective processes are assigned to realize accurate and efficient resources management. Further, the radio communication apparatus and method according to each embodiment of the invention enables efficient processing based on effective use of resources.

In addition, the change of processing by each processor in accordance with the communication system connected to the radio communication apparatus further enhances the processing efficiency.

The present invention is not limited to the above-described embodiments, but may be modified in various ways without departing from the scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication apparatus compatible with a plurality of communication systems and a plurality of application services, the radio communication apparatus comprising:
    a transceiver transmitting and receiving a radio signal;
    an executing unit configured to execute a first part of a digital signal processing which is executed in response to one of transmitting and receiving of the radio signal;
    a first processor connected to the executing unit, at least, controlling a connection between the radio communication apparatus and one of the communication systems, and the first processor being further capable of processing at least one application program related to the application services; and
    a second processor connected to the executing unit, executing a second part of the digital signal processing, and controlling the executing unit, wherein an amount of processing by the second processor being greater than an amount of processing by the first processor, the processing concerning the executing unit.

2. The radio communication apparatus according to claim 1, wherein a plurality of contents of processing by the first processor and a plurality of contents of processing by the second processor are changed, depending on which of the communication systems is connected to the radio communication apparatus.

3. The radio communication apparatus according to claim 1, further comprising a cache memory used by the first processor.

4. The radio communication apparatus according to claim 1, further comprising:
    a data memory formed of a DRAM and used by the first processor; and
    an instruction memory formed of a flash memory.

5. The radio communication apparatus according to claim 1, wherein the first processor executes handover processing between the communication systems, the handover processing being related to the connection between the radio communication apparatus and the one of the communication systems,
    wherein the handover processing including:
    (a) detecting whether a request for a connection to a second of the communication systems occurs, in response to one of a connection of the radio communication apparatus to the one of the communication systems and loading of a first communication program for communication with the one of the communication systems on the first processor,
    (b) downloading and compiling of a second communication program for communication with the second of the communication systems in response to the request for the connection to the second of the communication systems, and
    (c) connecting the radio communication apparatus to the second of the communication systems based on a compiling result of the second communication program.

6. The radio communication apparatus according to claim 1, wherein the first processor and the second processor employ respective software pieces of different layers.

7. The radio communication apparatus according to claim 1, wherein the first processor has a first characteristic capability regarding a frequency and response speed of signal exchange with the executing unit, and the second processor has a second characteristic capability regarding a frequency and response speed of signal exchange with the executing unit, wherein the first characteristic capability being lower than the second characteristic capability.

8. A radio communication apparatus compatible with a plurality of communication systems and a plurality of application services, the radio communication apparatus comprising:
    a transceiver transmitting and receiving a radio signal;
    an executing unit configured to execute a first part of a digital signal processing which is executed in response to one of transmitting and receiving of the radio signal;
    a first processor connected to the executing unit, executing a second part of the digital signal processing, and executing a first part of a communication control processing related to a connection between the radio communication apparatus and one of the communication systems, the first processor being further capable of processing at least one application program related to the application services;
    a second processor connected to the executing unit, executing a second part of the communication control processing, and controlling the executing unit, wherein an amount of processing by the second processor being greater than an amount of processing by the first processor, the processing concerning the executing unit; and a third processor connected to the executing unit and executing a third part of the digital signal processing, wherein an amount of processing by the third processor being greater than the amount of processing by the second processor, the processing concerning the executing unit.

9. The radio communication apparatus according to claim 8, wherein a plurality of contents of processing by the first processor, a plurality of contents of processing by the second processor and a plurality of contents of processing by the third processor are changed, depending on which of the communication systems is connected to the radio communication apparatus.

10. The radio communication apparatus according to claim 8, further comprising a cache memory used by the first processor.

11. The radio communication apparatus according to claim 8, further comprising:

a data memory formed of a DRAM and used by the first processor;

and an instruction memory formed of a flash memory.

12. The radio communication apparatus according to claim 8, wherein the first processor executes handover processing between the communication systems, the handover processing being related to the communication control processing, wherein the handover processing including:

(a) detecting whether a request for a connection to a second of the communication systems occurs, in response to one of a connection of the radio communication apparatus to the one of the communication systems and loading of a first communication program for communication with the one of the communication systems on the first processor, (b) downloading and compiling of a second communication program for communication with the second of the communication systems in response to the request for the connection to the second of the communication systems, and (c) connecting the radio communication apparatus to the second of the communication systems based on a compiling result of the second communication program.

13. The radio communication apparatus according to claim 8, wherein the first processor, the second processor and the third processor employ respective software pieces of different layers.

14. The radio communication apparatus according to claim 8, wherein the first processor has a first characteristic capability regarding a frequency and response speed of signal exchange with the executing unit, the second processor has a second characteristic capability regarding a frequency and response speed of signal exchange with the executing unit, and the third processor has a third characteristic capability regarding a frequency and response speed of signal exchange with the executing unit, wherein the first characteristic capability being lower than the second characteristic capability, and the second characteristic capability being lower than the third characteristic capability.

15. The radio communication apparatus according to claim 1, wherein: the second processor is included in each of a plurality of first units, and executes a software processing using a software system including at least one instruction language, each of the first units including one of a first function unit which directly operates in accordance with a first instruction of the second processor, a second function unit which selectively operates in accordance with a second instruction of the second processor and a third function unit which operates using a program in accordance with the second instruction of the second processor; and wherein the first processor is included in a second unit which controls the first units, the first processor instructing the second processor to operate the second processor.

16. The radio communication apparatus according to claim 15, wherein each of the first units executes an arithmetic operation on an input signal, and the second processor designates contents of a plurality of processes and an order of the processes to the input signal.

17. The radio communication apparatus according to claim 1, wherein the second processor is one of a plurality of resources for the digital signal processing, the second processor executing resource management to assign the digital signal processing in accordance with contents of the signal processing, and executing, in accordance with a program, the digital signal processing assigned as a result of the resource management; and the radio communication apparatus further comprising a plurality of signal units being other resources for the digital signal processing, the signal units executing an arithmetic operation based on a predetermined function to generate a desired operation result, the signal units executing the digital signal processing assigned as a result of the resource management by the second processor.

18. The radio communication apparatus according to claim 1, wherein the second processor is included in each of a plurality of first units, the first units including a plurality of function units which execute different processes for a plurality of desired inputs, the first units respectively executing an arithmetic operation on an input signal; and the first processor is included in a second unit which controls the first units, the second unit designating contents of a plurality of processes and an order of the processes to the input signal.

19. A radio communication method for use in a radio communication apparatus compatible with a plurality of communication systems and a plurality of application services, the radio communication method comprising:

executing a first part of a digital signal processing which is executed in response to a radio signal;

controlling a connection between the radio communication apparatus and one of the communication systems, and processing at least one application program related to the application services; and executing a second part of the digital signal processing, and controlling the first part of the digital signal processing, wherein an amount of processing when executing the second part and controlling the first part being greater than an amount of processing when controlling the connection and processing at least the one application program, the processing concerning the digital signal processing.

20. The radio communication method according to claim 19, wherein handover processing between the communication systems is executed, the handover processing being related to the connection between the radio communication apparatus and the one of the communication systems, wherein the handover processing including:
(a) detecting whether a request for a connection to a second of the communication systems occurs, in response to one of a connection of the radio communication apparatus to the one of the communication systems and loading of a first communication program for communication with the one of the communication systems on the first processor,
(b) downloading and compiling of a second communication program for communication with the second of the communication systems in response to the request for the connection to the second of the communication systems, and
(c) connecting the radio communication apparatus to the second of the communication systems based on a compiling result of the second communication program.

* * * * *